United States Patent
Chatellier et al.

(10) Patent No.: US 6,290,850 B1
(45) Date of Patent: Sep. 18, 2001

(54) METHOD FOR CONTROLLING AERATION SYSTEMS OF BIOLOGICAL TANKS TREATING WASTE WATER

(75) Inventors: Patrice Chatellier, Paris; Philippe Caulet, Bailly, both of (FR)

(73) Assignee: Suez-Lyonnaise des Eaux, Nanterre Cedex (FR)

( * ) Notice: Subject to any disclaimer, the term of this patent is extended or adjusted under 35 U.S.C. 154(b) by 0 days.

(21) Appl. No.: 09/509,799

(22) PCT Filed: Sep. 23, 1998

(86) PCT No.: PCT/FR98/02046

§ 371 Date: Jun. 2, 2000

§ 102(e) Date: Jun. 2, 2000

(87) PCT Pub. No.: WO99/18036

PCT Pub. Date: Apr. 15, 1999

(30) Foreign Application Priority Data

Oct. 2, 1997 (FR) .................................................. 97 12280

(51) Int. Cl.[7] .................. C02F 3/12; C02F 3/02
(52) U.S. Cl. .................. 210/614; 210/621; 210/623; 210/626
(58) Field of Search .................. 210/614, 620, 210/621, 623, 626, 622, 627

(56) References Cited

U.S. PATENT DOCUMENTS 3,342,727 * 9/1967 Bringle .
4,280,910 * 7/1981 Baumann .
4,818,408 * 4/1989 Hamamoto .
6,007,721 * 12/1999 Payraudeau et al. .

FOREIGN PATENT DOCUMENTS

0260187 * 3/1988 (EP) .
2184110 * 6/1987 (GB) .

* cited by examiner

Primary Examiner—Chester T. Barry
Assistant Examiner—Fred Prince
(74) Attorney, Agent, or Firm—Connolly Bove Lodge & Hutz

(57) ABSTRACT

Method of monitoring the efficiency of the aeration systems of biological basins of a wastewater treatment plant, characterized in that it consists in:
i) measuring the throughput (Qt) of the plant and the rate (Qr) of recirculation of the mixed liquor from the clarifier to the aeration basin; and
ii) measuring the concentration of dissolved oxygen in the aeration basin so as:
 a) to establish, during an aeration period, the material balance between oxygen supplied, oxygen consumed and oxygen discharged with the effluent;
 b) to establish, during a non-aeration period, the material balance between oxygen consumed and oxygen discharged with the effluent;
 c) to determine the amount of oxygen consumed by the biomass based on the two material balances established above; and
 d) to determine, from the data obtained at a), b) and c), the value of the transfer coefficient $\alpha k_L a$ under the conditions of the measurement.

4 Claims, 5 Drawing Sheets

DISSOLVED O$_2$ MEASUREMENT:

METHOD FOR CONTROLLING AERATION SYSTEMS OF BIOLOGICAL TANKS TREATING WASTE WATER

FIELD OF THE INVENTION

The present invention relates to a novel method of monitoring the aeration systems of biological basins of a wastewater treatment plant, this method having more particularly the objective of monitoring the efficiency of the aeration system. The invention applies to the case in which the aeration of the basin takes place by on/off sequences of the aeration system and it makes it possible in particular to take into account the case in which constant flows of biomass and of pollution enter and leave the basin during the monitoring, thus allowing regulation of the aerobic biological systems, based on various physical measurements which have the advantage of being rapidly obtainable, the method according to the invention thus allowing in-line regulation.

According to the invention and as will be explained below, these measurements relate to (FIG. 1):

- the concentration of dissolved oxygen in the aeration basin;
- the throughput Qt, through the plant; and
- the rate Qr of recirculation of the mixed liquor from the clarifier to the aeration basin.

BACKGROUND OF THE INVENTION

As a consequence of the European directives, the purification techniques currently employed are aiming to limit discharges into the natural environment of untreated wastewater, stations having to treat all collected water apart from that resulting from exceptional downpours. The common characteristic of these treatment stations is that of carrying out purification by activated sludge, comprising a treatment basin in which oxygen is transferred to the "water/biomass" mixture. This transfer is necessary for the development of the purifying biomass.

Furthermore, increased reliability is demanded by the European directives in question and therefore requires purification stations to be strictly monitored and to be maintained in the best possible state of operation, with a maximum available purifying capacity (that is to say with a biomass "in the top of its form" and with equipment in a perfect state of maintenance and operation).

One of the major causes of malfunction of purification stations is the deficiency or insufficiency of the oxygen supply; this oxygenation deficit is manifested long term by the appearance of anaerobiosis phenomena, resulting in the development of filamentary bacteria in the biomass and then the appearance of foams, the phenomenon of performance degradation being all the more rapid as it is autoaccelerated.

The efficiency of the aeration system is usually measured, before the purification station is commissioned, using in vitro measurement techniques which absolutely do not take into account the influence of the biomass on the oxygen transfer. This is because the transfer coefficient (which in this case we will call the standard transfer coefficient) is usually measured in clarified water and in the presence of sodium bisulphite—a reducing agent for oxygen; it is thus possible to control gas-liquid transfer, but to the exclusion of any biological phenomenon. On the other hand, when the biomass is "installed" in the aeration basin, the said biomass operates as a biological oxygen pump and it is then possible to obtain a corrected transfer coefficient $\alpha k_L a$, where $\alpha$ represents a correction coefficient having a value of between 0.5 and 0.9, which corrected transfer coefficient takes into account the biological operation, the differences in viscosity between the mixed liquor and the clarified water, and the differences in hydrodynamics resulting from operation in the presence of biomass. Once the station is running, tricky measurement techniques have to be used to determine the amount of oxygen transferred to the water/biomass mixture, while still obtaining only instantaneous values, giving, for example, no information about a possible drift in the efficiency of the aeration system.

The systems according to the prior art which are usually employed for monitoring and/or controlling the operation of wastewater purification stations are of various types:

- use of a delay, which acts on the frequency and the duration of the aeration periods;
- detection of the oxydoreduction-potential or oxygen-concentration thresholds in the aeration basin: thus, GB-A-2 184 110 describes an apparatus for the treatment of effluents in which means are used for monitoring the concentration of dissolved oxygen in the biological reactor as well as means for measuring the rate of reduction of the dissolved-oxygen concentration in the absence of aeration, and the information obtained is used to send an alarm signal when this reduction is below a predetermined set value; likewise, EP-A-0 260 187 relates to a biological treatment process for the purpose of optimising the management of the aeration, consisting in continuously measuring the dissolved-oxygen concentration during the aeration step, the concentration values thus obtained making it possible to compute the oxygen demand and to adjust the aeration;
- monitoring systems based on the derivative of the variation in the oxydoreduction potential as a function of time (FR-A-2 724 646).

BRIEF DESCRIPTION OF THE INVENTION

None of these systems solves the technical problem solved by the present invention, that is to say the establishment, during periods of aeration and of non-aeration, of the material balance between oxygen supplied, oxygen consumed and oxygen discharged with the effluent during the aeration phase and of the material balance between oxygen consumed and oxygen discharged with the effluent during the non-aeration phase, respectively, for this purpose of diagnosing any change in the performance of a station and therefore of anticipating possible incidents, the ultimate stage of their performance in this field being to trigger an alarm when the capacity limit of the plant is reached. Experience acquired shows the advantage of using preventative management, something which constitutes one of the objectives of the present invention. discharged with the effluent during the non-aeration phase, respectively, for the purpose of diagnosing any change in the performance of a station and therefore of anticipating possible incidents, the ultimate stage of their performance in this field being to trigger an alarm when the capacity limit of the plant is reached. Experience acquired shows the advantage of using preventative management, something which constitutes one of the objectives of the present invention.

Another objective of the invention is to measure in situ the amount of oxygen transferred to a biological reactor, thereby making it possible to take into account the influence of the biomass and of the hydraulics on the amount of oxygen transferred.

Preventative management of the operation of a biological purification station presupposes that the efficiency of the aeration system is regularly monitored. Such monitoring makes it possible to show that there is a progressive reduction in the efficiency of the apparatus, which phenomenon requires planning of any maintenance work and, periodically, the use of remedial measures such as, for example, increasing the number of aeration turbines or their speed of rotation. The monitoring method forming the subject of the invention has therefore been developed for the purpose of ensuring that the efficiency of the aeration system is monitored sufficiently frequently.

DETAILED DESCRIPTION OF THE INVENTION

According to the invention, the system uses an alternation of the on/off sequences of the aeration system of biological basins, resulting from the conventional running of the biological purification process in order to estimate the efficiency of the aeration system. It will be noted that the application of the monitoring procedure does not require the running of the process to be adapted or modified in any way.

Figure 1:
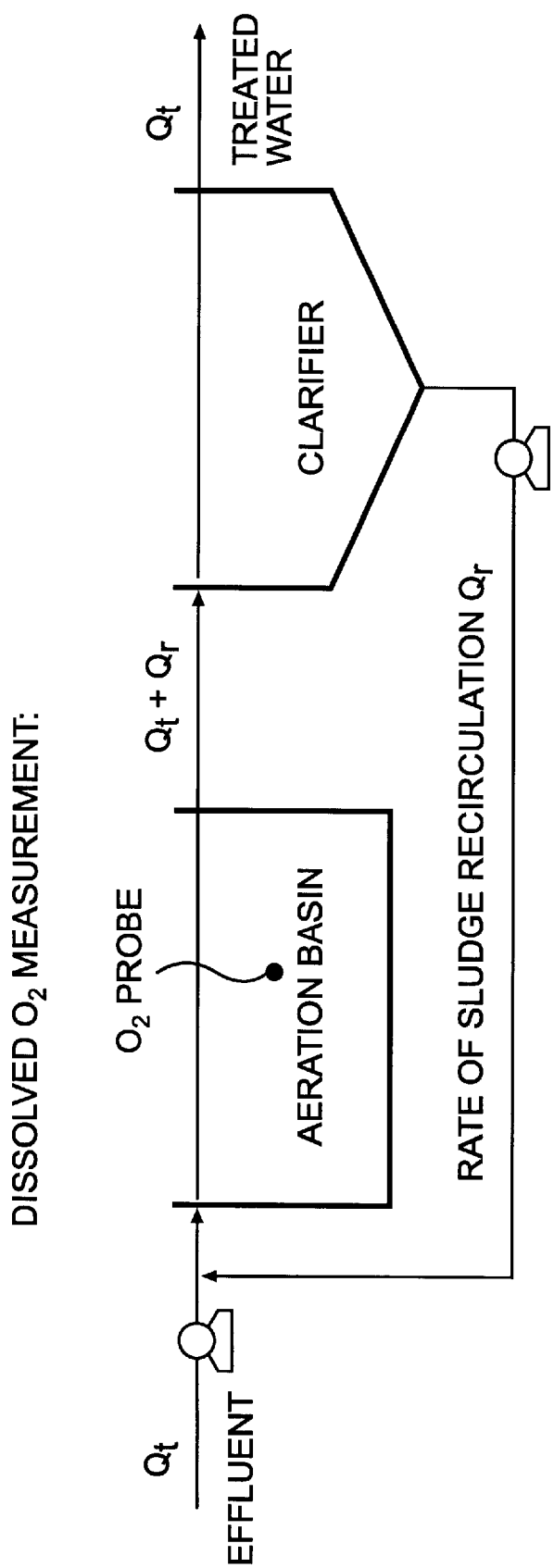
FIG. 1 is a basic flowchart of the present method.

An overview of the method forming the subject of the invention is shown in FIG. 1.

The phases of the method are seen to include:

i) measuring the throughput $Q_t$ of the plant and the rate $Q_r$ of recirculation of the mixed liquor from the clarifier to the aeration basin; and ii) measuring the concentration of dissolved oxygen in the aeration basin using an oxygen probe so as:

a) to establish, during an aeration period, the material balance between oxygen supplied, oxygen consumed and oxygen discharged with the effluent;

b) to establish, during a non-aeration period, the material balance between oxygen consumed and oxygen discharged with the effluent;

c) to determine the amount of oxygen consumed by the biomass based on the two material balances obtained above; and d) to determine, from the data obtained at a), b) and c), the value of the transfer coefficient $\alpha k_L a$ under the conditions of the measurement.

Figure 2:
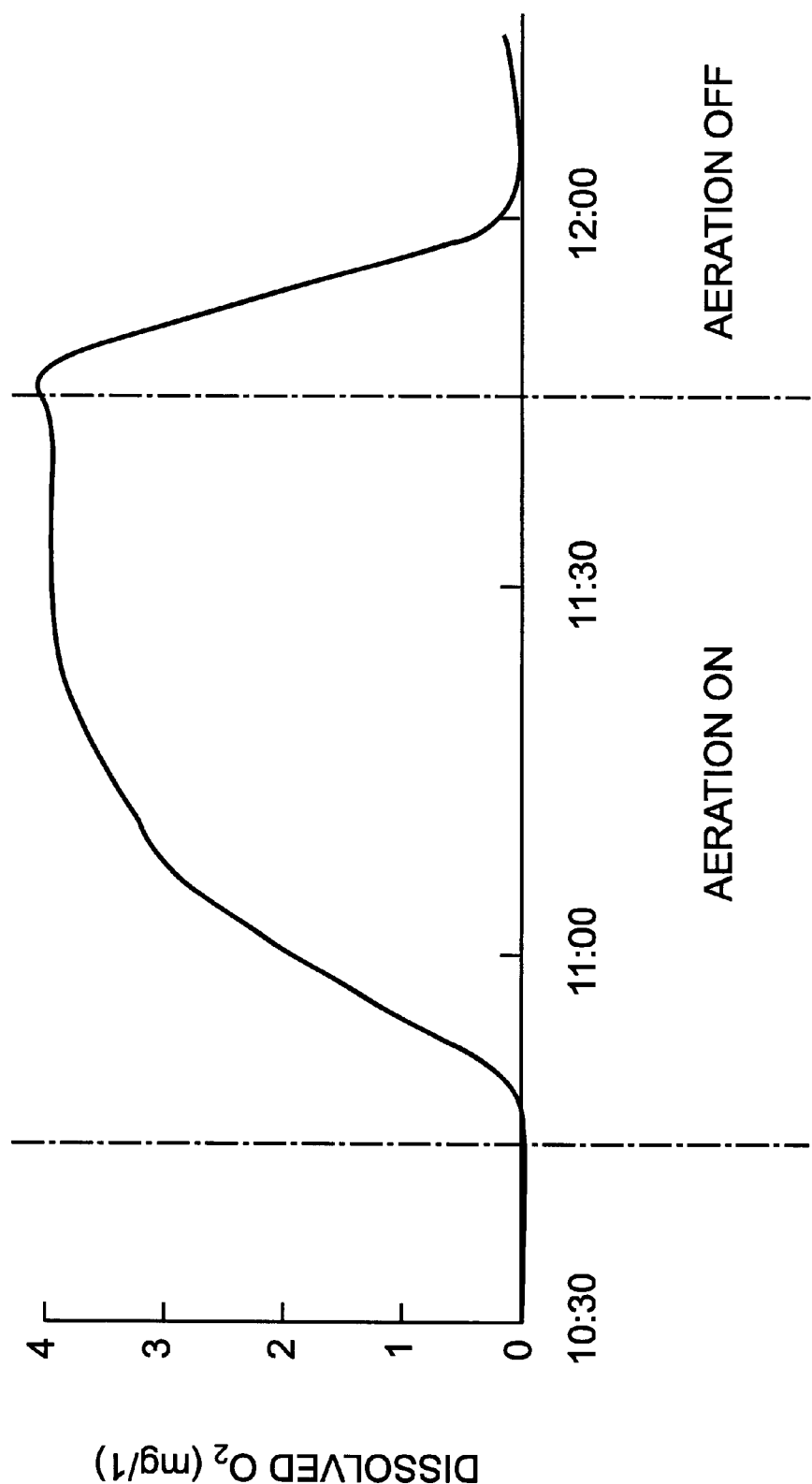
FIG. 2 is a plot of dissolved oxygen as a function of time and showing aeration and non-aeration phases.
Figure 3:
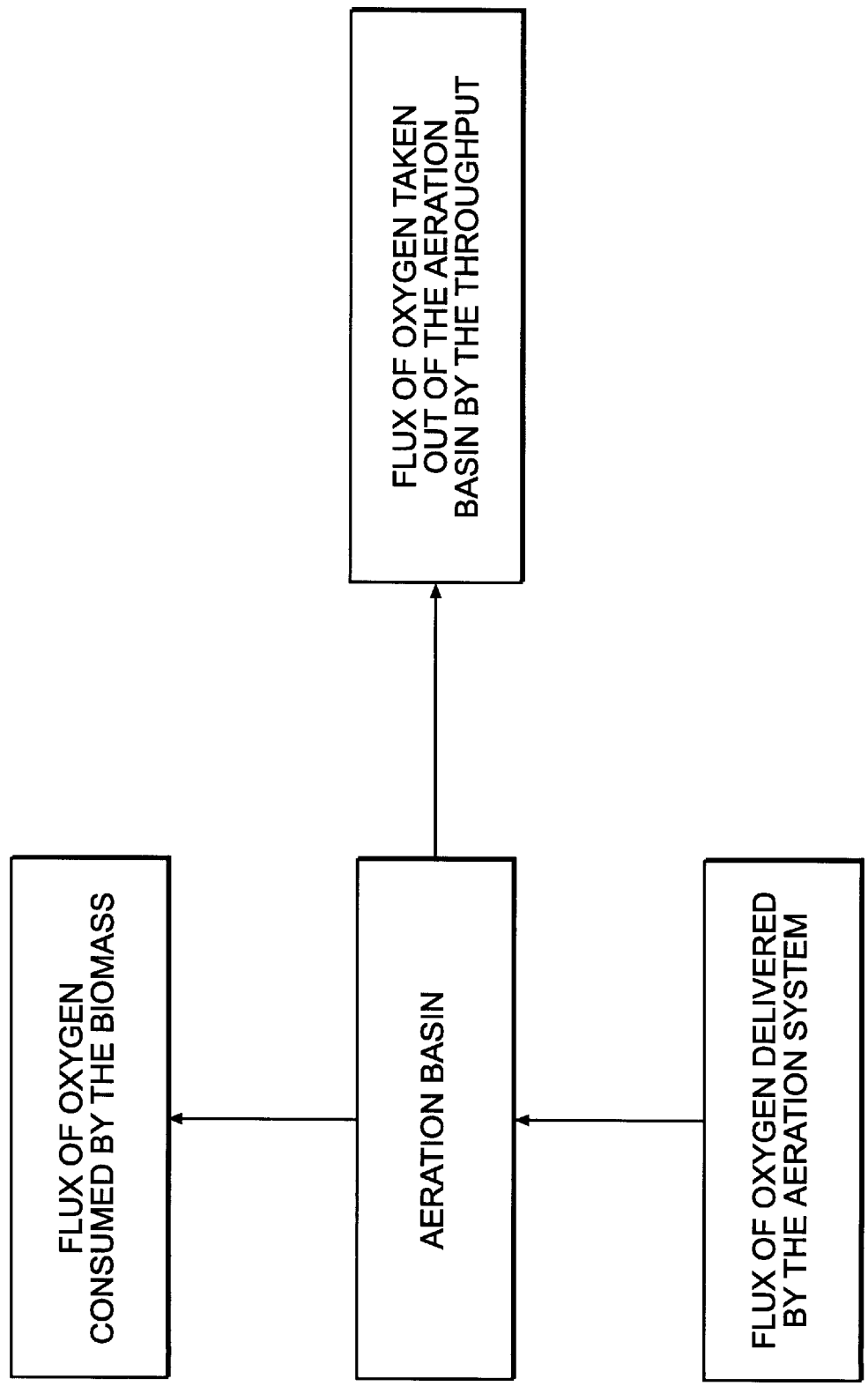
FIG. 3 is a basic flowchart of oxygen flux entering and leaving an aeration basin during an aeration phase.
Figure 4:
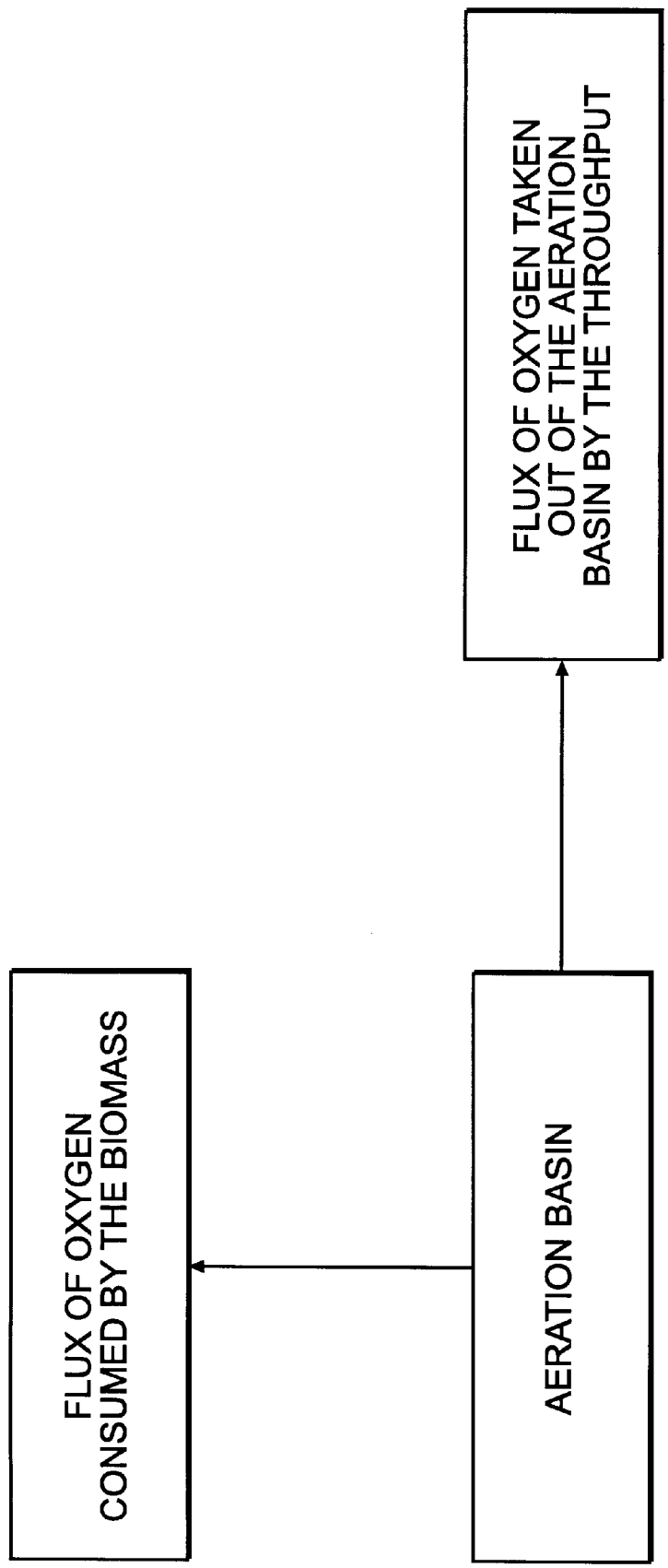
FIG. 4 is a basic flowchart of oxygen flux entering and leaving an aeration basin during the non-aeration phase.

As will have been understood, the monitoring method forming the subject of the invention is carried out two times, during the on/off cycles of the aeration (FIG. 2):

1. during the phase of injection by the aeration system of air (or oxygen) into the aeration basin, analysis of the information provided by the installed oxygen probes makes it possible to compute, on the one hand, the change in the amount of oxygen contained in the aeration basin and, on the other hand, the amount of oxygen leaving the said aeration basin, the amount of oxygen entering the basin, supplied by the untreated wastewater and by the recirculation flow being regarded as negligible. The principle of conservation of matter means that the amount of oxygen supplied by the aeration system exactly compensates for the sum of the amount of oxygen serving for the respiration of the biomass and the amount of oxygen leaving the areation basin (FIG. 3);

2. during the phase of shutting down the injection of air (or oxygen) into the aeration basin, an identical analysis to the one above makes it possible to compute the same mass balance, the amount of oxygen supplied by the aeration system then being zero (FIG. 4). With such a system of two equations with two unknowns, it is easy to obtain the value of the flux of oxygen transferred to the biomass and, consequently, the value of the transfer coefficient.

The change in the successive values of the transfer coefficient $\alpha k_L a$ as a function of time makes it possible to determine the variations in the efficiency of the aeration system or systems.

Figure 5:
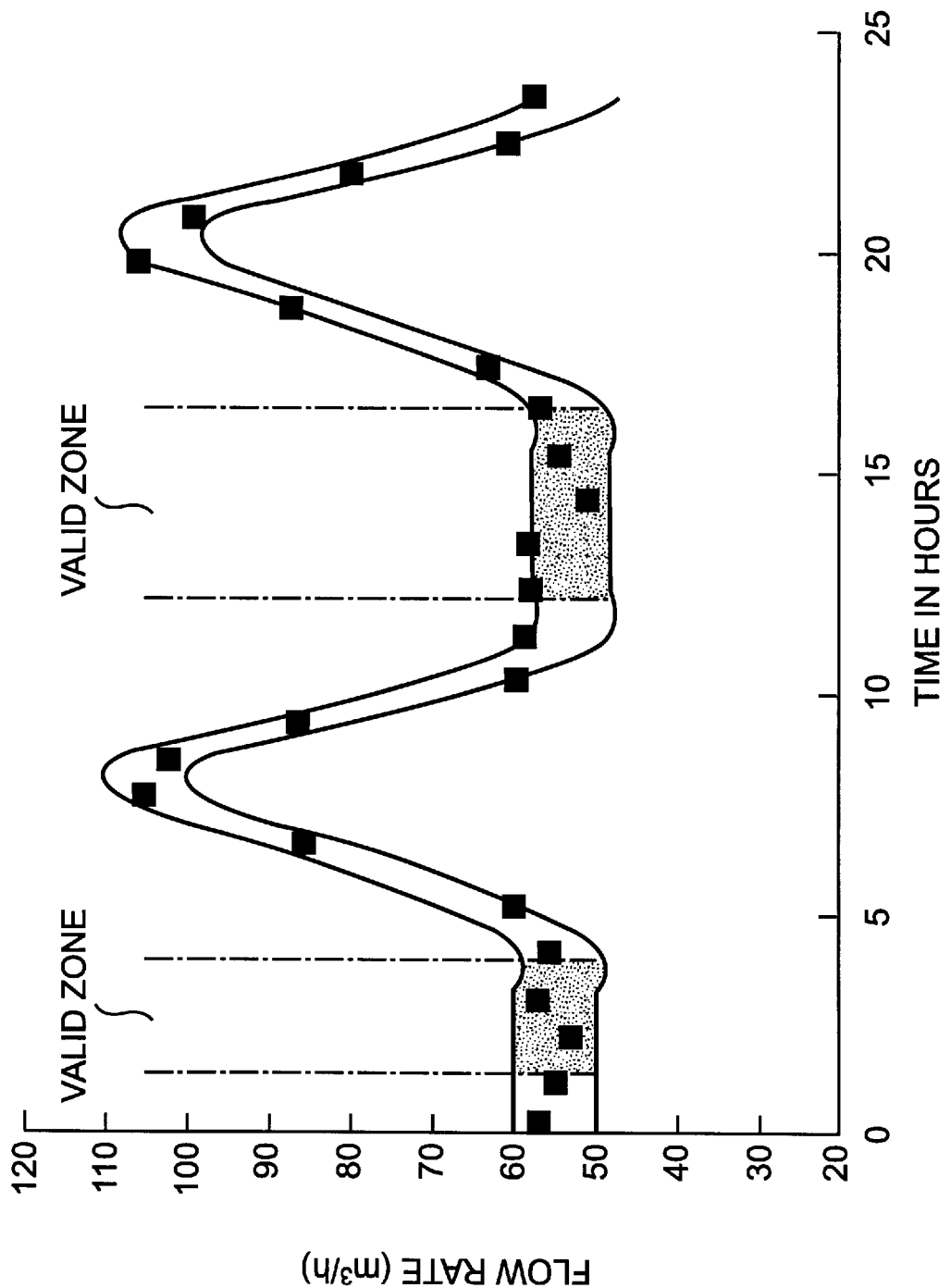
FIG. 5 is a plot of flow rate as a function of time and showing valid periods for measurements in accordance with the present invention.

Indicated in FIG. 5, which gives the variation in the throughput $Q_t$ as a function of time, are the periods of constant flow during which the measurements which make it possible to determine the value of the transfer coefficient are carried out. In this figure, the zones allowing a measurement representative of this transfer coefficient have been hatched.

Thus, one of the advantages of the method forming the subject of the invention is that it does not use respirometry apparatuses coupled to the aeration basin to carry out a measurement, which would remain a point measurement and in vitro. Moreover, it is not necessary to modify in any way whatever the conditions under which the plant is operated in order to obtain the results according to the invention, something which clearly distinguishes the invention from all of the systems described previously ("Les performances des systèmes d'aération d'épuration", méthodes de mesure et résultats, "The performance of purification aeration systems", measurement methods and results, Ministry of Agriculture, CTGREF, March 1980).

Thus it has been mentioned above that another advantageous characteristic of the method of the invention is that it allows the amount of oxygen consumed by the biomass to be measured in situ, thereby making it possible to take into account the influence of the biomass and of the hydraulics on the amount of oxygen transferred to the aeration basin.

Constant flows of liquid/biomass mixture may enter and leave the aeration basin during the monitoring. It is important for these flows to remain constant so that the flux of oxygen "breathed" by the biomass remains constant throughout the measurement cycle.

It will be understood from reading the foregoing description that the invention makes it possible to determine in real time the in situ efficiency of the aeration system, without modification to the running of the plant.

It is distinguished from the prior art in particular by:

the ability to monitor the state of operation and/or of fouling of the aeration system;

taking advantage of the aeration and the non-aeration periods to carry out the data acquisition.

Of course, it remains to be stated that the present invention is not limited to the embodiments described and/or illustrated, rather it encompasses all the variants thereof which fall within the scope of the appended claims.

What is claimed is:

1. Method of monitoring the efficiency of an aeration system of biological basins of a wastewater treatment plant, comprising the steps:
   i) measuring throughput (Qt) of the plant and a rate (Qr) of recirculation of a mixed liquor from a clarifier to an aeration basin; and
   ii) measuring concentration of dissolved oxygen in the aeration basin so as:
      a) to establish, during an aeration period, material balance between oxygen supplied, oxygen consumed and oxygen discharged with effluent;
      b) to establish, during a non-aeration period, the material balance between oxygen consumed and oxygen discharged with the effluent;
      c) to determine an amount of oxygen consumed by a biomass based on the two material balances established above; and
      d) to determine, from data obtained at a), b) and c), a value of a transfer coefficient $\alpha k_L a$ under conditions of a measurement.

2. Method according to claim 1, wherein flows of liquid/biomass mixture leaving and entering the aeration basin remain constant during the measurement so that flux of oxygen "breathed" by the biomass remains constant throughout a measurement cycle.

3. Method according to claim 1, wherein the method includes an additional step consisting in taking corrective actions based on determination of efficiency of the aeration system.

4. Method according to claim 2, wherein the method includes an additional step of taking corrective actions based on a determination of efficiency of the aeration system.

* * * * *